UNITED STATES PATENT OFFICE.

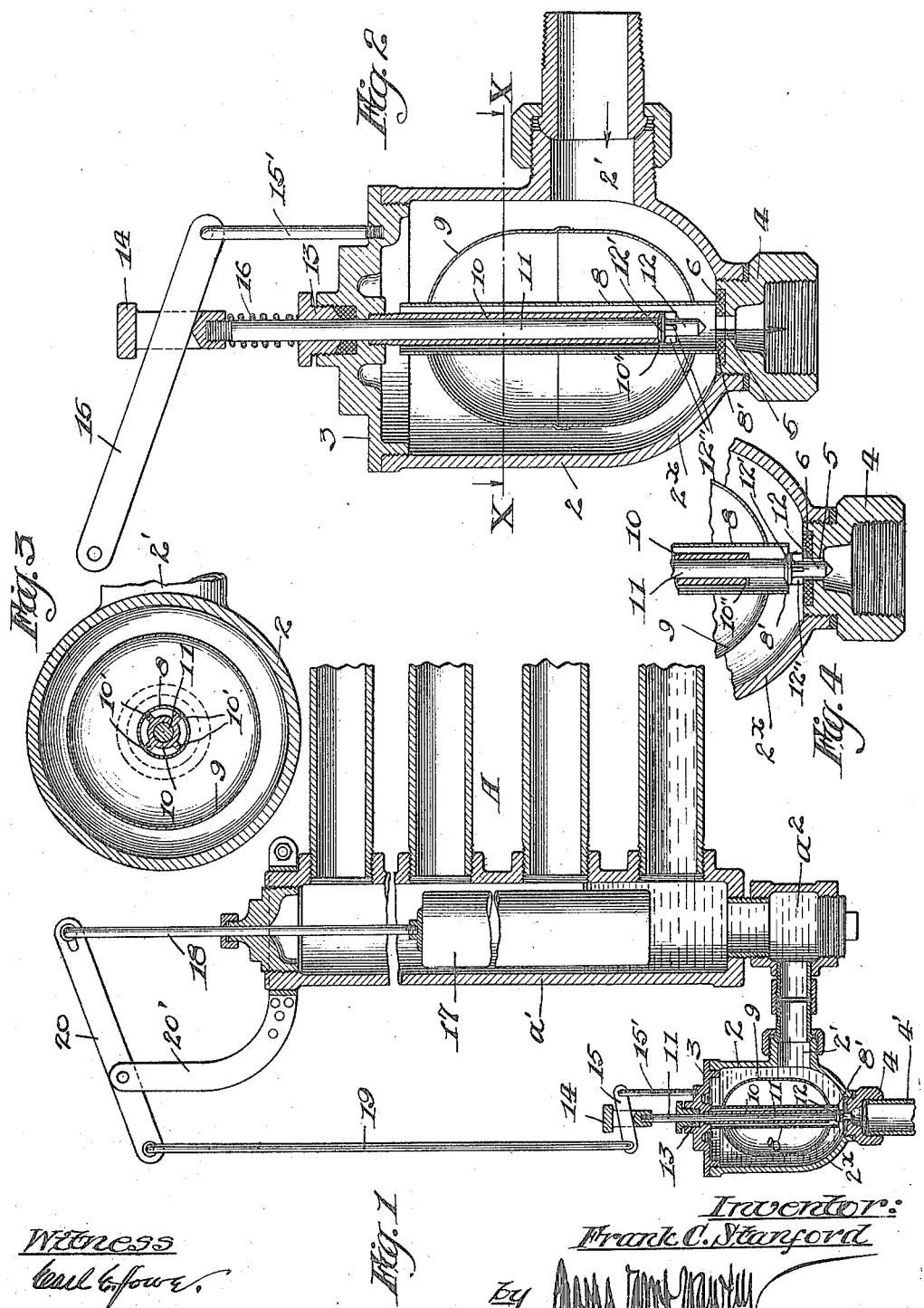

FRANK C. STANFORD, OF CHICAGO, ILLINOIS, ASSIGNOR OF ONE-HALF TO GEORGE C. BRETT, OF CHICAGO, ILLINOIS.

STEAM-TRAP.

1,263,479.

Specification of Letters Patent.

Patented Apr. 23, 1918.

Application filed April 30, 1915. Serial No. 24,939.

*To all whom it may concern:*

Be it known that I, FRANK C. STANFORD, a citizen of the United States, and a resident of Chicago, county of Cook, and State of Illinois, have invented certain new and useful Improvements in Steam-Traps, of which the following is a specification.

My invention relates generally to improvements in steam traps for various uses, but has special reference to steam traps of that class used for intermittently discharging the water of condensation from the heating units of vacuum steam-heating systems, and the like.

In the operation of such systems much trouble and expense is caused by the clogging of the traps with scale and sediment from the radiators or heating units with which they are connected; and the primary object of my invention is to overcome this difficulty by providing means whereby such traps may be easily and quickly cleared, and caused to act properly. Other incidental objects of my invention will appear hereinafter.

My invention consists in a steam trap, comprising a casing, having a discharge orifice; a valve for closing said orifice; and, a float for lifting said valve when water accumulates in the casing; in combination with a plunger normally positioned above the orifice and adapted to enter said orifice and thus clear it when clogged, irrespective of the position of the valve and float.

My invention may, and preferably does, include means for automatically actuating the clearing plunger when the orifice of the trap becomes so clogged as to prevent the seating of the valve.

And further my invention consists in various novel details of construction and in combinations of parts whereby the foregoing objects and effects are accomplished, all as hereinafter described and particularly pointed out in the appended claims.

The invention will be more readily understood by reference to the accompanying drawings, forming part of this specification, and in which:—

Figure 1, is a vertical section of a steam trap embodying my invention, showing also a portion of the steam radiator or heating unit, and the means which I employ for automatically actuating the clearing plunger of the trap;

Fig. 2, is an enlarged vertical section of my novel steam trap;

Fig. 3, is a horizontal section, on the line X—X of Fig. 2; and

Fig. 4, is a detail taken from Fig. 2 and showing the plunger in its depressed or operating position.

Referring first to Figs. 2, 3, and 4, it will be seen that the casing of the steam trap comprises the body 2 provided with the inlet, 2′, a head or cap, 3, and the valve seat piece or plug, 4. The head, 3, and the plug, 4, are co-axial. The plug contains the outlet orifice, 5, of the trap. On the end of the plug, surrounding the orifice, 5, and containing a continuation thereof, is a soft packing, 6, upon which the hereinafter described valve finds its seat. It will be noted that the plug is much smaller than the head, 3, and that the side walls of the body are pitched or inclined toward the orifice 5. In practice I prefer that the bottom portion $2^x$ of the body 2 shall be substantially hemispherical; thus providing the walls which pitch toward the orifice 5. The plug 4 contains an internal thread to receive the end of the return pipe 4′, and forms convenient means for coupling the trap to the return pipe. The plug itself is threaded into the bottom of the casing and may be removed when it is desired to inspect or repair the valve seat 6. The valve, which co-acts with the seat 6, is formed by the lower end 8′ of the tube 8. This tube is open at both its upper and lower ends and forms the central part of the hollow float 9. For guiding the float and valve I employ a stem 10, fastened in the head 3 and co-axial with the orifice 5. The stem 10 is externally fluted as shown in Fig. 3, and is thus provided with the ribs 10′ that serve to guide and center the valve tube 8. The tube 8 is of less height than the space between the seat 6 and the head 3; and therefore, the tube and the float may rise and fall within the casing.

As remarked, the tube is open at the top, and when the lower end of the tube 8 is seated on the packing 6, the trap is still in communication with the orifice 5, through the channels afforded by the fluted stem 10 and the open upper end of the tube 8. In this manner the partial vacuum condition below the orifice 5 is communicated to the interior of the trap and to the heating unit connected therewith.

Referring now to Fig. 1, it will be seen that the end of a radiator or heating unit A has a vertical header a'. The lower end of the header is joined with the inlet 2' of the trap by the connection a². Under normal conditions, as when the unit A is substantially free from water, the valve end 8' is seated at the orifice of the trap and the vacuum connection is effected through the valve tube 8, as above explained. But as water accumulates in the unit and flows into the casing of the trap, the float is raised; and thereby, the valve is lifted from the seat and the water passes out through the orifice 5.

Few if any heating units are free from scale and sediment. In consequence such solids are washed into the trap by the flow of the water of condensation. In ordinary traps such an accumulation of solids effectually prevents the reseating of the valve after it is lifted from its seat and the valve therefore remains open and inoperative, defeating the function of the trap. I have already explained one feature of my improved trap by which I overcome this difficulty; namely, the hoppered or concaved bottom of the casing that causes the solids to collect near the orifice. A second and more important feature comprises a centrally arranged plunger, preferably somewhat smaller than the orifice 5 and which may be pushed into the orifice, to clear the same whenever necessary. In practice I arrange the plunger so that it may be operated manually in all cases and in some cases automatically, as shown in Fig. 1. For this purpose I employ a stem 10 which is hollow and arrange therein the plunger above mentioned. Thus, as shown in Fig. 2, the stem 10 contains the plunger rod 11, the latter terminating in a plunger point 12 normally positioned directly above the orifice 5 and preferably having a sharp lower end. At the juncture of the plunger proper 12 and the stem or rod 11, I form a collar 12' and provide it with a conical surface to seat on the correspondingly formed lower end 10" of the hollow stem 10; for a purpose about to be described. To prevent the seating of the bottom of the collar 12 on the packing 6 and completely closing the orifice 5 when the plunger is depressed, I provide the plunger with several short offsetting lugs or wings 12" which limit the down stroke of the plunger. The action thereof will be clearly understood on comparing Fig. 2 with Fig. 4.

The upper end of the rod 11 passes through a stuffing box 13 on the head 3. Said upper end of the rod is equipped with a push-knob 14, which forms a fulcrum yoke for the operating lever 15. Between the stuffing box 13 and the knob 14 is a spring 16 that lifts the plunger and normally keeps it out of the orifice 5. The spring obviously holds the collar 12' firmly against the lower end of the stem 10, and in this manner leakage through the hollow stem is prevented while the plunger is in lifted position. The stuffing box 13 performs a similar office during the brief time that the plunger is depressed; in other words, while the plunger is in the position depicted in Fig. 4.

Anyone who is skilled in the art will now understand that in event solids accumulate at the orifice, the plunger may be thrust down through the orifice, and thus clear it by pushing the solids through the opening and into the return pipe.

Obviously, the plunger will operate to clear the orifice irrespective of the position of the valve 8', that is, the plunger may be operated when the valve is seated; but as a rule its operation is necessary only at times when the valve is held away from the seat by an accumulation of solids thereon. As shown in Fig. 4, the plunger point is preferable considerably smaller than the orifice, and even when the plunger occupies the orifice there is still a free passage for both water and steam.

Various devices may be applied for automatically operating the clearing plunger but I prefer the simple device shown in Fig. 1, the same comprising a float 17 arranged in the header a' of the heating unit and connected with the plunger stem by the rods 18 and 19 and the two levers 15 and 20. The lever 15 is pivoted on the trap head by means of the rod or link 15', and the lever 20 is supported on the header by means of an arm 20' clamped to the upper end of the header.

It will be understood that when the trap clogs water will accumulate; i. e., back up, in the header a' and lift the float 17; and that this movement of the float 17 is communicated to the plunger 12; and, that when thrust down through the orifice, the plunger remains therein until the water subsides or drains away through the orifice.

The knob 14 is not hidden by the automatic connections; therefore the plunger may be worked by hand at any time; as in event the automatic device fails to act properly, or in case an unusual amount of scale accumulates in the trap.

As various modifications of my invention will readily suggest themselves to one skilled in the art, I do not limit my invention to the precise structures herein shown and described.

Having thus described my invention, I claim as new and desire to secure by Letters Patent:

1. An improved steam trap, having a hoppered bottom containing a discharge orifice the upper end of which is flush with the lowest part of said bottom, in combination with a tubular valve presenting an end to said orifice, a valve float, a valve guiding stem, and an orifice-clearing plunger manually operating through said stem to clear said orifice, substantially as described.

2. The improvements herein described, comprising a steam trap casing having in its bottom a discharge orifice surrounded by a valve seat, in combination with a tubular valve normally co-acting with said seat to close said orifice, a valve float, an orifice-clearing plunger, and means limiting the stroke of said plunger.

3. The improvements herein described, comprising a steam trap casing having in its bottom a discharge orifice surrounded by a valve seat, in combination with a tubular valve normally co-acting with said seat to close said orifice, a valve float, an orifice clearing plunger and means limiting the stroke of said plunger in both directions.

4. The improvements herein described, comprising a steam trap casing having in its bottom a discharge orifice surrounded by a valve seat, in combination with a tubular valve normally co-acting with said seat to close said orifice, a valve float, a valve guiding stem, an orifice clearing plunger working in said stem, and a shoulder on said plunger, normally closing the joint between said stem and plunger.

5. The improvements herein described, comprising a steam trap casing having in its bottom a discharge orifice surrounded by a valve seat, in combination with a tubular valve normally co-acting with said seat to close said orifice, a valve float, a valve guiding stem, an orifice clearing plunger working in said stem, and a shoulder on said plunger normally closing the joint between said stem and plunger, and a stop on the plunger for limiting the clearing stroke of the plunger in said orifice.

6. The improvements herein described, comprising a heating unit and a connected steam trap casing containing a discharge orifice in its bottom, in combination with a valve normally closing said orifice, a valve float, an orifice clearing plunger, and means including a float in the heating unit and connected levers operating to automatically actuate said plunger when the discharge orifice becomes clogged and the heating unit fills with water, substantially as described.

7. The improvement herein described comprising a steam heating unit, in combination with an automatic water discharging trap connected therewith, a trap-clearing device in said trap, and a float in said unit and arranged to operate said device.

In testimony whereof, I have hereunto set my hand, this 27th day of April, 1915.

FRANK C. STANFORD.

Copies of this patent may be obtained for five cents each, by addressing the "Commissioner of Patents, Washington, D. C."